United States Patent
Schillinger et al.

[11] Patent Number: 5,961,145
[45] Date of Patent: Oct. 5, 1999

[54] MOBILE MACHINE WITH LATERALLY PIVOTED SUPPORTING STRUTS

[75] Inventors: Hans-Dieter Schillinger, Neuhausen, Germany; Klaus Lörincz, Racine, Wis.

[73] Assignee: Putzmeister Aktiengesellschaft, Germany

[21] Appl. No.: 09/011,863

[22] PCT Filed: Jun. 22, 1996

[86] PCT No.: PCT/EP96/02724

§ 371 Date: May 26, 1998

§ 102(e) Date: May 26, 1998

[87] PCT Pub. No.: WO97/08026

PCT Pub. Date: Mar. 6, 1997

[30] Foreign Application Priority Data

Aug. 29, 1995 [DE] Germany .......................... 195 31 697

[51] Int. Cl.[6] .................................................. B60S 9/02
[52] U.S. Cl. .................. 280/764.1; 280/764; 280/766.1; 212/304
[58] Field of Search .................. 280/124.134, 764.1, 280/766.1, 763.1, 765.1, 43.17, 43.23; 212/301, 302, 303, 304, 305

[56] References Cited

U.S. PATENT DOCUMENTS

| 769,461 | 10/1904 | Bennett | 280/766.1 |
|---|---|---|---|
| 3,854,595 | 12/1974 | Kuhn | 212/145 |
| 4,394,913 | 7/1983 | Lanning et al. | 212/189 |
| 4,761,021 | 8/1988 | Lagsdin | 280/764 |
| 5,015,008 | 5/1991 | Schupback | 280/764.1 |
| 5,135,145 | 8/1992 | Hannes et al. | 224/314 |
| 5,706,960 | 1/1998 | Pitman et al. | 212/304 |

Primary Examiner—Lanna Mai
Assistant Examiner—James S. McClellan
Attorney, Agent, or Firm—Pendorf & Cutliff

[57] ABSTRACT

The invention relates to a mobile machine (16, 20, 22) with a multi-axle chassis (14). To provide support to the ground, there is at least one support strut (30, 32) which can be supported on the ground at its free end on a vertically extendible foot (54) and can pivot about a pivoting axis (26, 28) on the chassis (14) parallel to the vertical axis of the vehicle from an inoperative position against a longitudinal side of the chassis into a laterally pivoted supporting position. In order to be able to transmit both vertical and horizontal forces and movements to the ground via the struts (30, 32) largely without plat and slip, each strut (30, 32) has a locking mechanism which secures it in its outwardly pivoted supporting position against rotation about its pivoting axis (26, 28).

11 Claims, 4 Drawing Sheets

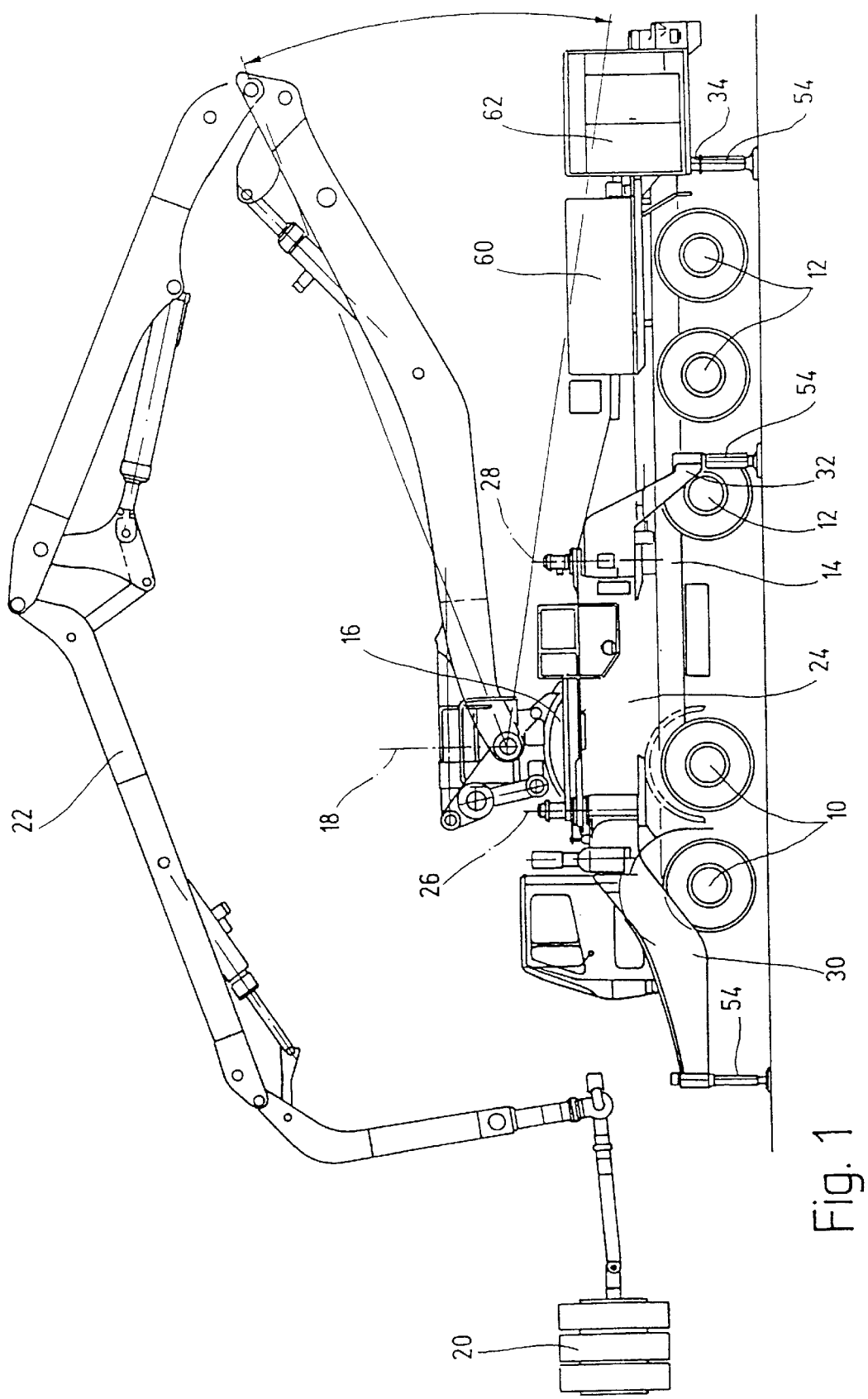

MOBILE MACHINE WITH LATERALLY PIVOTED SUPPORTING STRUTS

BACKGROUND OF THE INVENTION

1. Field of the Invention

The invention is related to a mobile machine, having a multi-axle vehicle chassis carrying the machine and at least one supporting strut which is pivotal about a pivot axis parallel to the vertical axis of the vehicle on the vehicle chassis or a support frame fixed to the vehicle chassis from an inoperative position in which it is pivoted against a longitudinal side of the chassis into a laterally pivoted supporting position, the free end of which supporting strut is adapted to be supported on the ground by means of a preferably vertically extendable foot portion.

2. Description of the Related Art

In a known mobile machine of this type it is known (DE-A-44 28 069) to pivot the supporting struts, which are connected to a support frame of the chassis pivotal about a horizontal pivot axis, with respect to the chassis by means of double-acting hydraulic cylinders. In the course of the pivoting action, the supporting struts attain an outermost pivot position which is given by the arrangement of the hydraulic cylinders. However, a uniquely defined pivotal positioning of the supporting struts with respect to the chassis is not ensured thereby. Since the supporting struts have to divert the vertical forces imposed on the chassis by the machine as well as the horizontal forces into the ground, pivoting may occur in the region of the supporting struts due to moments and lateral forces occurring during the operation of the machine, which lead to position changes of the machine. This is of disadvantage especially when an exact positioning of the machine during its operation is important, as for instance during washing of airplanes with large manipulators functioning as the machine.

Based on this, it is the object of the invention to improve a mobile machine of the type described above with respect to the arrangement of its supporting struts such that a transmission of both vertical and horizontal forces to the ground without play and slip in the region of the supporting struts becomes possible.

SUMMARY OF THE INVENTION

The solution according to the invention is based on the idea that the supporting struts are secured against rotation in the region of their pivot bearing in the laterally pivoted position. According to the invention, this is obtained by providing a locking mechanism which prevents the supporting strut from rotating about its pivot axis in its laterally pivoted supporting position.

According to a preferred embodiment of the invention it is provided that the supporting strut in its laterally pivoted supporting position, is limitedly movable with respect to the chassis between a locking position and a releasing position of the locking mechanism, parallel to its pivot axis. To this end, the locking mechanism may comprise a claw coupling which is disposed between axially facing, strut-fixed and chassis-fixed surfaces, and which is adapted to be engaged without free play in the laterally pivoted supporting position by axial lifting of the supporting strut. The movement is expediently effected by at least one lifting member which is disposed between the chassis or the support frame on the one hand and the supporting strut on the other hand, and which is preferably designed to be a hydraulic cylinder. According to an advantageous design, the supporting strut is borne between two chassis-fixed bearing brackets which are disposed spaced at a distance above each other, such that it can be pivoted as well as lifted and lowered.

According to a preferred embodiment of the invention it is provided that the supporting strut is adapted to be limitedly pivotal about the pivot axis by means of a preferably hydraulic motor. In order to be able to hold the supporting strut in its laterally pivoted end position after a pivot movement has been performed and until the securing by means of the locking mechanism can be effected, it is of advantage when the motor comprises a braking or locking member which is adapted to be operated independently of the locking mechanism. In this, the motor expediently comprises a torque converter which radially protrudes over its motor casing and which is non-rotatably connected with its free end to the supporting strut at a distance from the pivot axis. In order to be able to absorb horizontal forces occurring during operation even better, it is of advantage when the foot portion comprises a sole made of an elastomeric material which is preferably corrugated on its bottom side.

A further preferred embodiment of the invention provides that at least two supporting struts, which are laterally pivotal and secured against rotation in their laterally pivoted supporting position, are disposed on each longitudinal side of the vehicle chassis. For a further improvement of protection against rotation, one supporting leg may be disposed in the rearward region of each longitudinal side of the vehicle chassis, which is rigidly connected to the vehicle chassis or the support frame and which comprises a vertically extendable foot portion.

BRIEF DESCRIPTION OF THE DRAWINGS

In the following, the invention will be further described with reference to the drawing, in which:

FIG. 1 shows a side view of a mobile airplane washing device in a raised working position;

DETAILED DESCRIPTION OF THE INVENTION

Figure 2A:
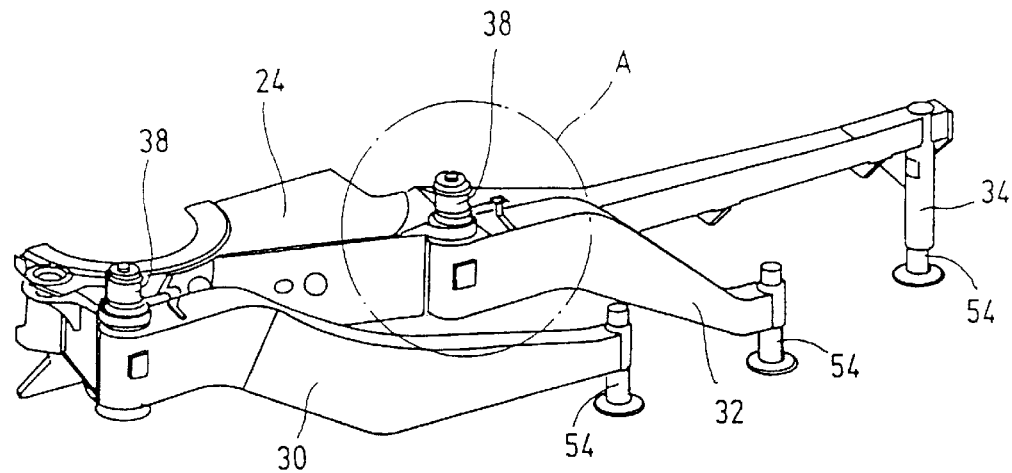
FIGS. 2a and b show a section of the support frame of the mobile airplane washing device according to FIG. 1 in a diagrammatical representation with retracted and extended supporting struts.

The mobile airplane washing device shown in FIG. 1 consists essentially of a vehicle chassis 14 having two front axles 10 and three rear axles 12, an articulated mast 22 which is rotatably borne about a vertical axis 18 on a mast bearer 16 and which carries a washing brush 20 on its free end, and a support construction comprising a chassis-fixed support frame 24, two each forward and center supporting struts 30, 32 which are pivotal about vertical axes 26, 28 on the support frame, and two rearward support legs 34 which are rigidly connected to the support frame 24.

Figures 3A, 3B:
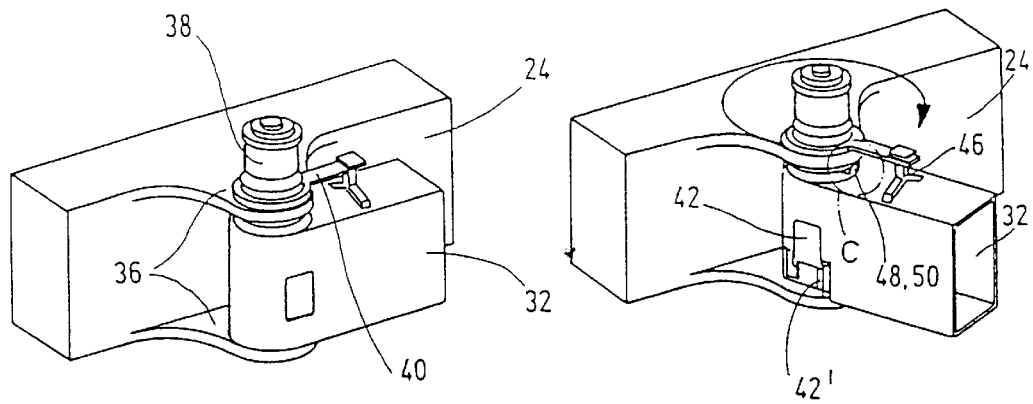
FIGS. 3a to e show the details A and B in FIGS. 2a and b in an enlarged representation in a number of different pivot and lift positions of the supporting strut.
Figure 3C:
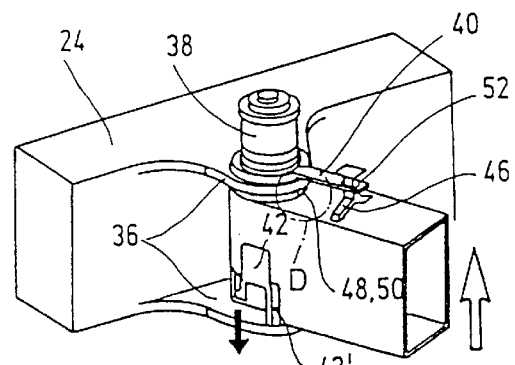
Figures 3D, 3E:
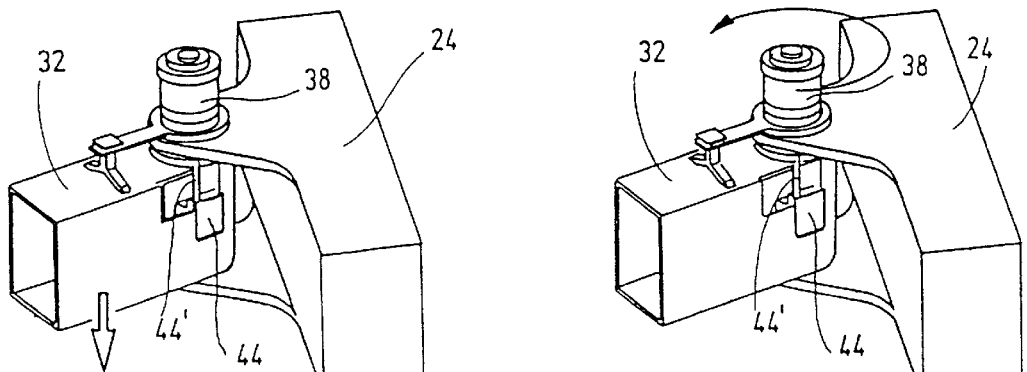

The supporting struts 30, 32 are borne between two bearing brackets 36 of the support frame 24, pivotally by means of a hydraulic motor 38 and a torque converter 40 about the vertical axes 26, 28 and limitedly movable upwards and downwards by means of two hydraulic cylinders 42, 44 each. The cylinder part of the hydraulic cylinders 42, 44 is connected to the supporting struts 30, 32, while the piston rod 42' of the hydraulic cylinder 42 is mounted on the lower and the piston rod 44' of the hydraulic cylinder 44 on the upper bearing bracket 36. The torque converter 40 which radially protrudes over the casing of the motor 38 is connected to a driver 46 of the supporting struts 30, 32, which is disposed at a distance from the axis 26 and 28, respectively. A guide opening 52 in the torque converter 40 ensures that the driver 46 can move with respect to the torque converter 40 during the lifting and lowering of the supporting struts 30, 32 (see FIGS. 3c and d).

Figure 4A:
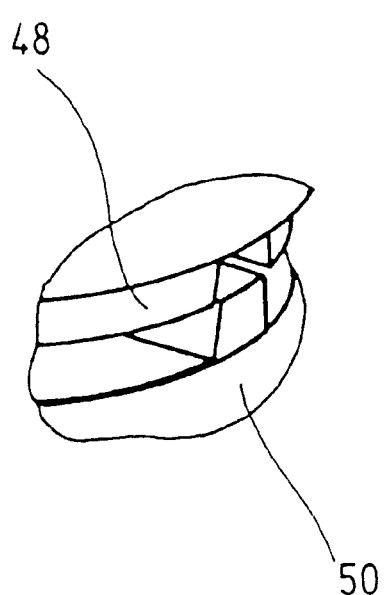
FIGS. 4a and b show the details C and D of FIGS. 3b and c in an enlarged representation.
Figure 4B:
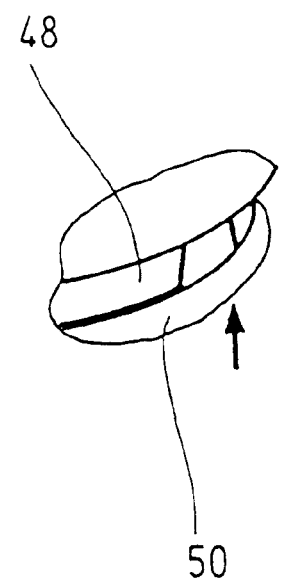

The hydraulic cylinders 42, 44 are part of a locking mechanism. The locking mechanism additionally comprises a support frame-fixed claw ring 48 and a strut-fixed claw ring 50, the locking claws of which can be brought from the unlocked position shown in FIG. 4a into the locked position shown in FIG. 4b by lifting the corresponding supporting strut 30, 32 with the aid of the hydraulic cylinders 42, 44 when the supporting strut 30, 32 is in its laterally pivoted position.

Figure 2B:
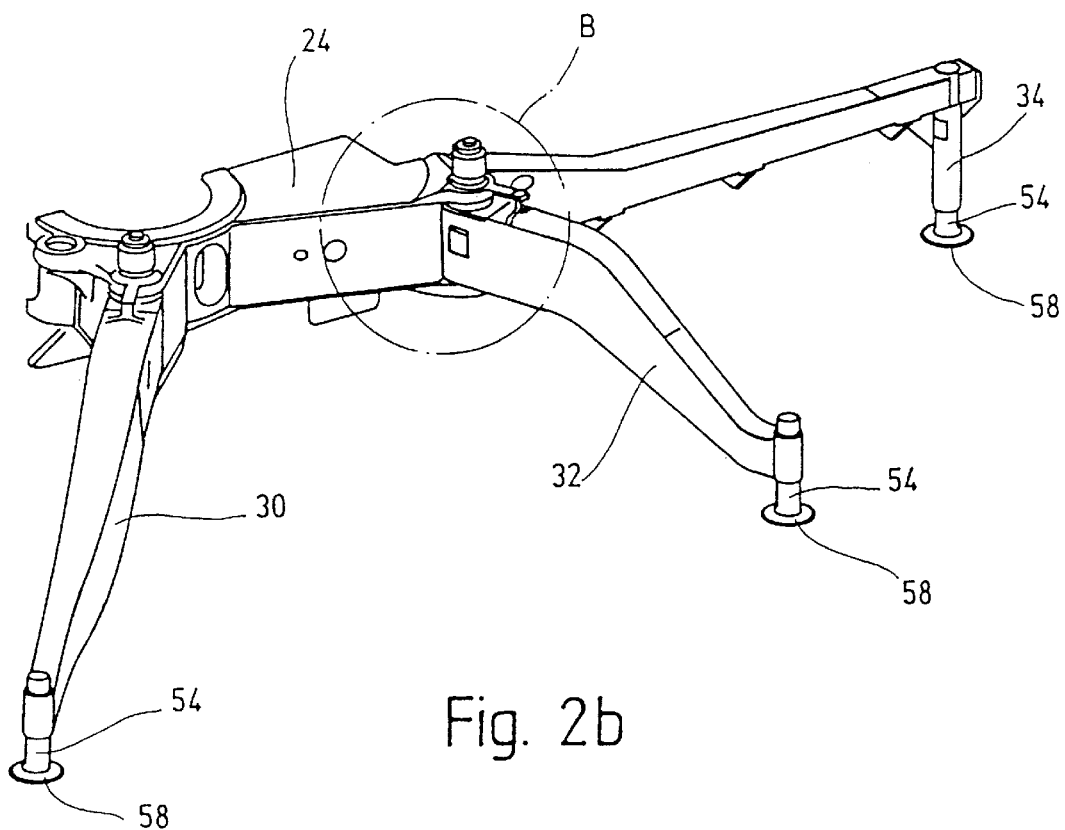

The supporting struts 30, 32 and the rearward support legs 34 have a foot portion 54 at their free end, which can be lowered toward the ground 56 by hydraulic means, so that the vehicle chassis 14 with its wheels 10, 12 is lifted off from the ground 56 (FIGS. 1, 2b). The lowering of the foot portion 54 can be effected only after the supporting struts 30, 32 have been pivoted into their supporting position and the locking mechanism 48, 50 has been brought into its locked position by lifting the supporting struts 30, 32 by means of the hydraulic cylinders 42, 44. With these measures it is ensured that the vertical and horizontal forces and moments transmitted to the vehicle chassis 14 by the airplane washing device can be transmitted to the ground 56 essentially without play or slip. A further improvement in this regard is obtained in that the foot portions 54 comprise a sole 58 made of an elastomeric material which is corrugated on its bottom side. The additionally provided rearward support legs 34 ensure that the dimensions of the supporting struts 30, 32 may be kept to a minimum and that sufficient space for washing agent tanks 60 and control boxes 62 remains between the supporting struts 32 and the rearward support legs 34.

In summary the following is to be stated: The invention relates to a mobile machine, having a multi-axle vehicle chassis 14 carrying the machine 16, 20, 22. For the support on the ground there is provided at least one supporting strut 30, 32 which is pivotal about a pivot axis 26, 28 parallel to the vertical axis of the vehicle on the vehicle chassis 14 or a support frame 24 fixed to the vehicle chassis from an inoperative position in which it is pivoted against a longitudinal side of the chassis 14 into a laterally pivoted supporting position, the free end of which supporting strut 30, 32 is adapted to be supported on the ground by means of a preferably vertically extendable foot portion 54. In order to be able to transmit vertical as well as horizontal forces to the ground by way of the supporting struts 30, 32 essentially without play or slip, each supporting strut 30, 32 is provided with a locking mechanism which prevents the supporting strut 30, 32 from rotating about its pivot axis 26, 28 in its laterally pivoted supporting position.

What is claimed is:

1. A mobile machine, having a multi-axle vehicle chassis (14) carrying the machine and at least one supporting strut (30, 32) which is pivotal about a pivot axis (26, 28) parallel to the vertical axis of the vehicle on the vehicle chassis (14) or a support frame (24) fixed to the vehicle chassis from an inoperative position in which said supporting strut is pivoted against a longitudinal side of the chassis (14) into a laterally pivoted supporting position, the free end of which supporting strut (30, 32) is adapted to be supported on the ground by means of an extendable foot portion (54), and comprising a locking mechanism (2, 44, 48, 50) which prevents the supporting strut (30, 32) from rotating about its pivot axis (26, 28) in its laterally pivoted and locked supporting position, wherein the supporting strut (30, 32), in its laterally pivoted supporting position, is vertically displaceable along said pivot axis between a locked position and a released position, wherein said supporting strut (30, 32) when in said locked position, engages with a locking mechanism, and wherein vertical displacement of said supporting strut to said released position disengages said strut from said locking mechanism.

2. The mobile machine of claim 1, wherein the locking mechanism comprises a claw coupling (48, 50) which is disposed between axially facing, strut-fixed and chassis-fixed surfaces, and which is adapted to be engaged without free play in the laterally pivoted supporting position by axial lifting of the supporting strut (30, 32).

3. The mobile machine of claim 1, wherein the locking mechanism comprises at least one lifting member which is disposed between the chassis (14) or the support frame (24) on the one hand and the supporting strut (30, 32) on the other hand.

4. The mobile machine of claim 1, wherein the supporting strut (30, 32) is borne between two chassis-fixed bearing brackets (36) which are disposed spaced at a distance above each other, such that said supporting strut (30, 32) can be pivoted as well as lifted and lowered.

5. The mobile machine according to claim 1, wherein the supporting strut (30, 32) is adapted to be limitedly pivotal about the pivot axis (26, 28) by means of a preferably hydraulic motor (38).

6. The mobile machine of claim 5, wherein the motor (38) comprises a braking or locking member which is adapted to be operated independently of the locking mechanism.

7. The mobile machine of claim 1, wherein the foot portion (54) comprises a sole (58) made of an elastomeric material which is preferably corrugated on its bottom side.

8. The mobile machine according to claim 1 wherein at least four supporting struts, with at least two supporting struts (30, 32), which are laterally pivotal and secured against rotation in their laterally pivoted supporting position, disposed on each longitudinal side of the vehicle chassis (14).

9. The mobile machine of claim 1, wherein one supporting leg (34) disposed in the rearward region of each longitudinal side of the vehicle chassis (14), which is rigidly connected to the vehicle chassis (14) or the support frame (24) and which comprises a vertically extendable foot portion (54).

10. The mobile machine of claim 3, wherein said lifting member is a hydraulic cylinder (42, 44).

11. A mobile machine, having a multi-axle vehicle chassis (14) carrying the machine and at least one supporting strut (30, 32) which is pivotal about a pivot axis (26, 28) parallel to the vertical axis of the vehicle on the vehicle chassis (14) or a support frame (24) fixed to the vehicle chassis from an inoperative position in which said supporting strut is pivoted against a longitudinal side of the chassis (14) into a laterally pivoted supporting position, the free end of which supporting strut (30, 32) is adapted to be supported on the ground by means of an extendable foot portion (54), and comprising a locking mechanism (2, 44, 48, 50) which prevents the supporting strut (30, 32) from rotating about its pivot axis (26, 28) in its laterally pivoted and locked supporting position, wherein the supporting strut (30, 32), in its laterally pivoted supporting position, is vertically displaceable along said pivot axis between a locked position and a released position, wherein said supporting strut (30, 32) when in said locked position, engages with a locking mechanism, and wherein vertical displacement of said supporting strut to said released position disengages said strut from said locking mechanism, wherein the supporting strut (30, 32) is adapted to be limitedly pivotal about the pivot axis (26, 28) by means of a hydraulic motor (38), wherein the motor (38) comprises a braking or locking member which is adapted to be operated independently of the locking mechanisms, and wherein the motor (38) comprises a torque converter (40) which radially protrudes over its motor casing and which is non-rotatably connected with its free end to the supporting strut (30, 32) at a distance from the pivot axis.

\* \* \* \* \*